(12) United States Patent
Cho et al.

(10) Patent No.: US 12,153,825 B2
(45) Date of Patent: Nov. 26, 2024

(54) MEMORY CONTROLLER AND METHOD OF OPERATING THE SAME

(71) Applicant: SK hynix Inc., Icheon-si (KR)

(72) Inventors: Young Ick Cho, Icheon-si (KR); Do Hyung Kim, Icheon-si (KR); Chi Heon Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 108 days.

(21) Appl. No.: 17/724,081

(22) Filed: Apr. 19, 2022

(65) Prior Publication Data

US 2023/0103797 A1 Apr. 6, 2023

(30) Foreign Application Priority Data

Oct. 5, 2021 (KR) .................. 10-2021-0131603

(51) Int. Cl.
*G06F 3/06* (2006.01)
(52) U.S. Cl.
CPC ............ *G06F 3/0655* (2013.01); *G06F 3/061* (2013.01); *G06F 3/0673* (2013.01)
(58) Field of Classification Search
CPC ...... G06F 3/0655; G06F 3/061; G06F 3/0673; G06F 3/0638; G06F 3/0679; G06F 3/0659; G06F 3/0604; G06F 3/0634; G06F 3/0658; G06F 12/063
See application file for complete search history.

(56) References Cited

U.S. PATENT DOCUMENTS

| | | | | |
|---|---|---|---|---|
| 2020/0334138 A1* | 10/2020 | Byun | .................. | G06F 12/0246 |
| 2021/0397365 A1* | 12/2021 | Kim | ..................... | G06F 3/0611 |
| 2021/0397370 A1* | 12/2021 | Chen | .................... | G06F 3/0613 |
| 2022/0066696 A1* | 3/2022 | Kang | .................... | G06F 3/0679 |
| 2022/0113900 A1* | 4/2022 | Um | ..................... | G06F 12/0804 |
| 2022/0114087 A1* | 4/2022 | Kim | .................... | G06F 13/1673 |

FOREIGN PATENT DOCUMENTS

| | | |
|---|---|---|
| KR | 20170120489 A | 10/2017 |
| KR | 20210111993 A | 9/2021 |

* cited by examiner

*Primary Examiner* — Zhuo H Li
(74) *Attorney, Agent, or Firm* — Perkins Coie LLP

(57) ABSTRACT

The disclosed technology relates to an electronic device. According to the disclosed technology, a memory controller for a storage device for storing data in connection with a host in communication with the storage device includes a recommendation signal manager configured to store a plurality of recommendation signals that recommends activating a memory area of the host that stores mapping information in the memory area of the host, and a host controller configured to provide at least one of the plurality of recommendation signals to the host according to whether a number of recommendation signals provided to the host is less than a threshold value.

20 Claims, 12 Drawing Sheets

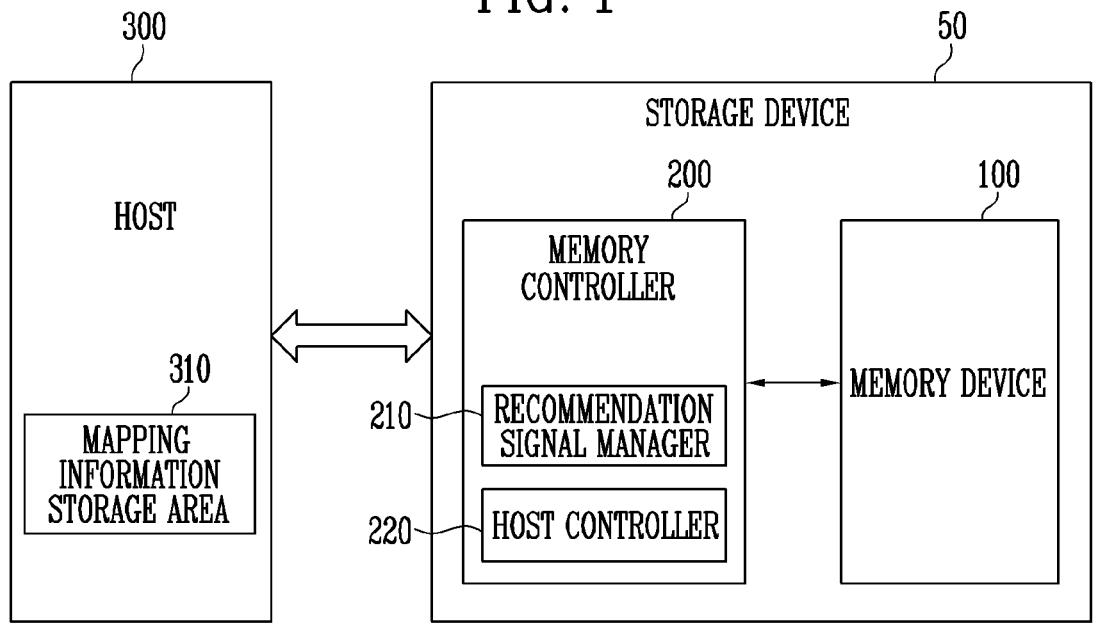
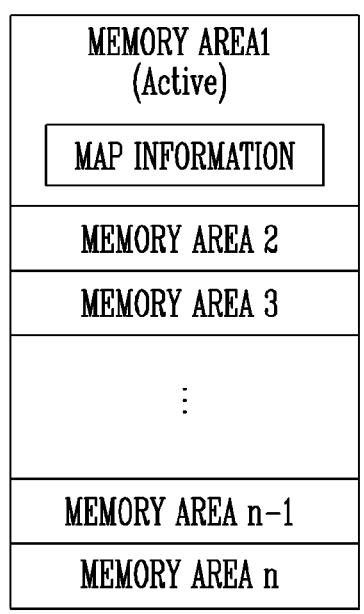

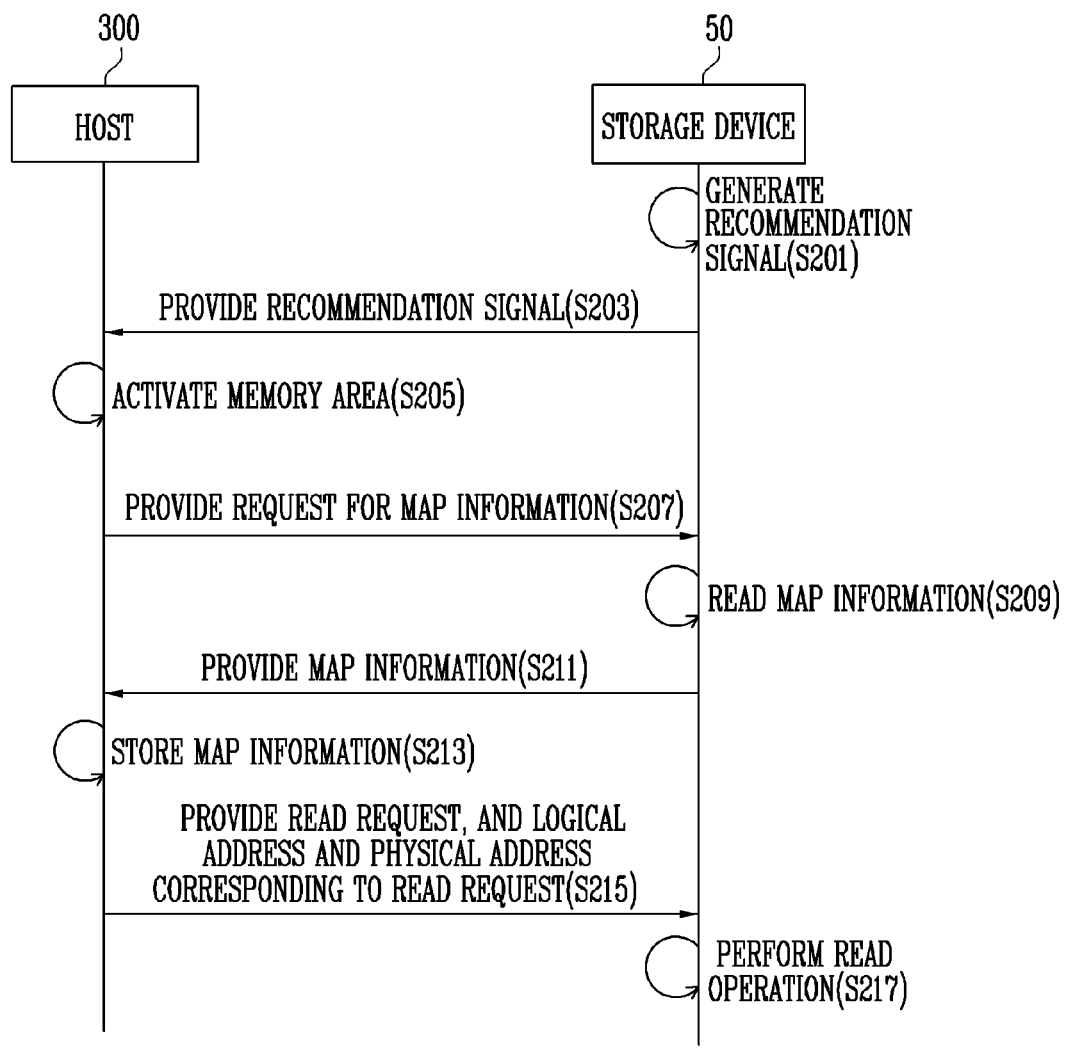

FIG. 4
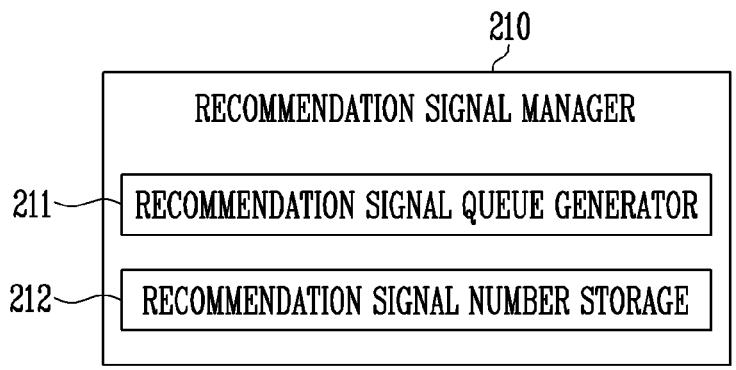
FIG. 5
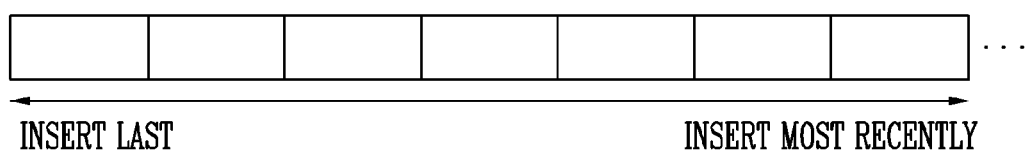
FIG. 6
212
| # RCD | threshold |
|-------|-----------|
| x     | i         |

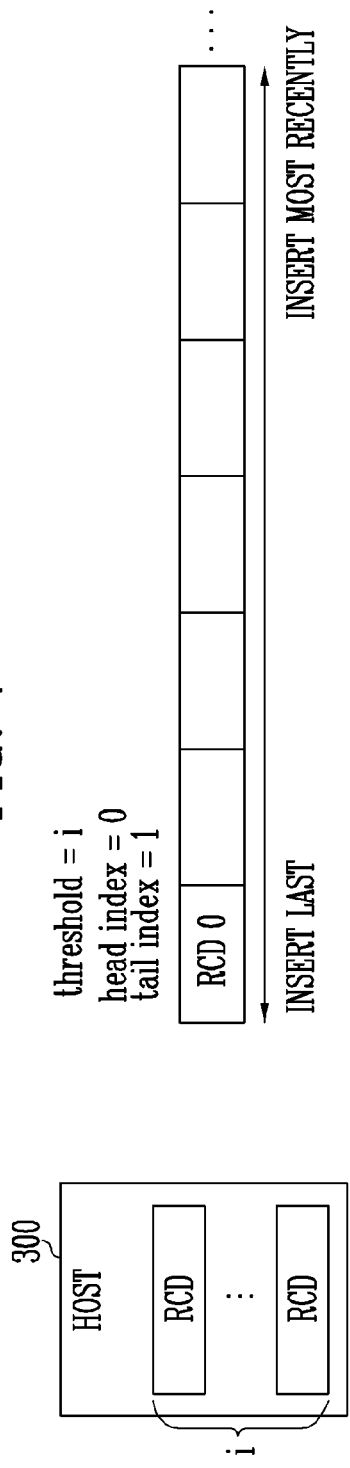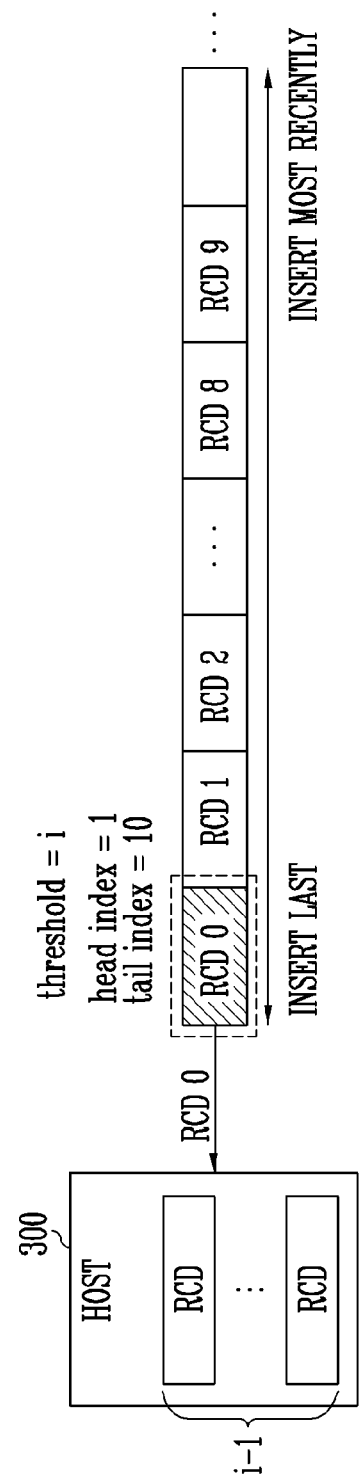

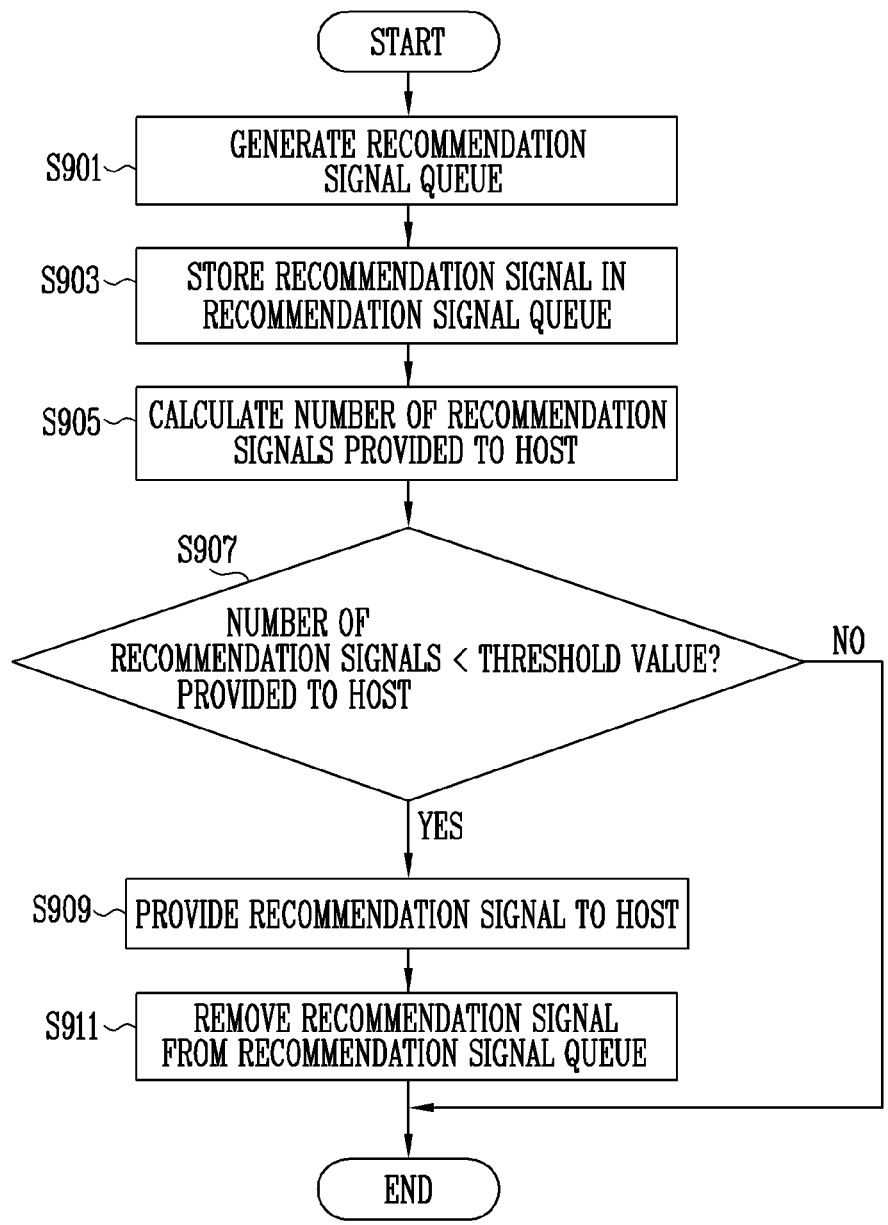

MEMORY CONTROLLER AND METHOD OF OPERATING THE SAME

CROSS-REFERENCE TO RELATED APPLICATION

This patent document claims the priority and benefits of the Korean patent application number 10-2021-0131603, filed on Oct. 5, 2021, which is incorporated herein by reference in its entirety.

TECHNICAL FIELD

The disclosed technology relates to an electronic device, and more particularly, to a memory controller and a method of operating the same.

BACKGROUND

A data storage device is a device that is used by a host device such as a computer or a smartphone to store data. A data storage device may include a memory device storing data and a memory controller controlling the memory device. The memory device may be classified into a volatile memory device and a nonvolatile memory device.

The volatile memory device only retains its data while the device is powered and loses its data when power is lost. Examples of the volatile memory device may include a static random access memory (SRAM), and a dynamic random access memory (DRAM).

The nonvolatile memory device retains stored data even in the absence of power supply and thus does not lose its data when power is lost. Examples of the nonvolatile memory device includes a read only memory (ROM), a programmable ROM (PROM), an electrically programmable ROM (EPROM), an electrically erasable and programmable ROM (EEPROM), and a flash memory.

SUMMARY

The disclosed technology can be implemented in some embodiments to provide a data storage device and a method of operating the same that can improve performance.

In some embodiments of the disclosed technology, a memory controller for a storage device for storing data in connection with a host in communication with the storage device includes a recommendation signal manager configured to store a plurality of recommendation signals that recommends activating a memory area of the host that stores mapping information in the memory area of the host, and a host controller configured to provide at least one of the plurality of recommendation signals to the host according to whether a number of recommendation signals provided to the host is less than a threshold value.

In some embodiments of the disclosed technology, a method of operating a memory controller includes generating a recommendation signal queue storing a plurality of recommendation signals that recommend activating a memory area of a host to store mapping information in the memory area of the host, calculating a number of recommendation signals provided to the host, and providing at least one of the plurality of recommendation signals to the host according to whether the number of recommendation signals provided to the host is less than a threshold value.

In some embodiments of the disclosed technology, a memory controller having improved performance includes a recommendation signal manager configured to store a plurality of recommendation signals for activating a memory area of a host that stores map data, and a host controller configured to provide at least one recommendation signal among the plurality of recommendation signals to the host according to whether the number of recommendation signals provided to the host is less than a preset threshold value.

In some embodiments of the disclosed technology, a method of operating a memory controller includes generating a recommendation signal queue storing a plurality of recommendation signals for activating a memory area of a host that stores map data, calculating the number of recommendation signals provided to the host, and providing at least one recommendation signal among the plurality of recommendation signals to the host according to whether the number of recommendation signals provided to the host is less than a preset threshold value.

In some embodiments of the disclosed technology, a storage device having improved performance and a method of operating the same are provided.

BRIEF DESCRIPTION OF THE DRAWINGS

FIG. 1 is a diagram illustrating an example of a storage device based on some embodiments of the disclosed technology.

FIG. 2 is a diagram illustrating an example of a mapping information storage area based on some embodiments of the disclosed technology.

FIG. 3 is a diagram illustrating example operations of a host and a storage device based on some embodiments of the disclosed technology.

FIG. 4 is a diagram illustrating an example of a recommendation signal manager based on some embodiments of the disclosed technology.

FIG. 5 is a diagram illustrating an example of a recommendation signal queue based on some embodiments of the disclosed technology.

FIG. 6 is a diagram illustrating a recommendation signal number storage circuit based on some embodiments of the disclosed technology.

FIG. 7 is a diagram illustrating an example operation of storing a recommendation signal in a recommendation signal queue based on some embodiments of the disclosed technology.

FIG. 8 is a diagram illustrating an example operation of providing a recommendation signal to a host based on some embodiments of the disclosed technology.

FIG. 9 is a flowchart illustrating an example method of operating a memory controller based on some embodiments of the disclosed technology.

DETAILED DESCRIPTION

Figure 10:
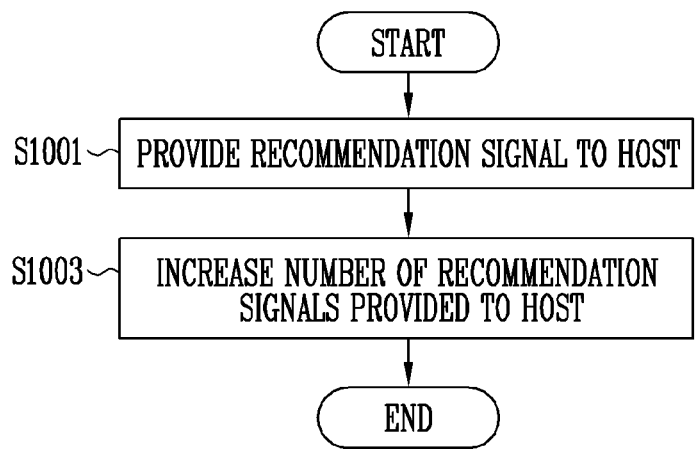
FIG. 10 is a flowchart illustrating an example operation of calculating the number of recommendation signals provided to a host based on some embodiments of the disclosed technology.

Specific structural features or functions for certain embodiments disclosed in this patent document are examples only to illustrate certain implementations of the disclosed technology.

FIG. 1 is a diagram illustrating an example of a storage device 50 based on some embodiments of the disclosed technology. In this patent document, the term "storage device" may be used to indicate a data storage device.

Referring to FIG. 1, the storage device 50 may include a memory device 100 and a memory controller 200 that controls an operation of the memory device. The storage device 50 may be a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) that stores four data bits The memory cell array (not shown) may include a plurality of memory blocks. Each memory block may include a plurality of memory cells. One memory block may include a plurality of pages. In an embodiment, the page may be the minimum unit for read or write (program) operations on the memory device 100. The memory block may be the minimum unit for erase operations.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or others. In the present specification, for convenience of description, it is assumed that the memory device 100 is a NAND flash memory.

The memory device 100 is configured to receive a command CMD and an address ADDR from the memory controller 200 and access an area selected by the address in the memory cell array. The memory device 100 may perform an operation instructed by the command CMD on the area selected by the address ADDR. For example, the memory device 100 may perform a write operation (program operation), a read operation, and an erase operation. During the write operation, the memory device 100 may program data in the area selected by the address ADDR. During the read operation, the memory device 100 may read data from the area selected by the address ADDR. During the erase operation, the memory device 100 may erase data stored in the area selected by the address ADDR.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 300, a flash translation layer (FTL) that controls or facilitates communication between the host 300 and the memory device 100, and a flash interface layer (FIL) that controls or facilitates communication between the memory device 100 and the host 300.

In an embodiment, the memory controller 200 may receive data and a logical block address (LBA) from the host 300 and may convert the LBA into a physical block address (PBA) indicating an address of memory cells in which data included in the memory device 100 is to be stored. In this patent document, the LBA and a "logic address" or a "logical address" may be used to indicate a virtual address that does not physically exist but is mapped to a physical address, and the PBA may be used to indicate a "physical address."

The memory controller 200 may control the memory device 100 to perform the write operation, the read operation, or the erase operation according to a request of the host 300. During the write operation, the memory controller 200 may provide a write command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may be connected to the memory device 100 through a channel. For example, the memory controller 200 may control the memory device 100 to perform the write operation, the read operation, the erase operation, or others by providing a command and an address to the memory device 100 through the channel.

In an embodiment, the memory controller 200 may generate a command, an address, and data independently regardless of the request from the host 300 and transmit the command, the address, and the data to the memory device 100. For example, the memory controller 200 may provide the command, the address, and the data for performing a read operation and write operations accompanying in performing wear leveling, read reclaim, garbage collection, and others, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

In an embodiment, the memory device 100 may store mapping information. The mapping information may indicate a mapping relationship between a logical address of the host 300 and a physical address of the memory device 100. In addition, the memory controller 200 may read and store some of the mapping information from the memory device 100. The memory controller 200 may obtain a physical address corresponding to the logical address of the host during the read operation by using the stored mapping information.

In an embodiment, the host 300 and the storage device 50 may operate using a host performance booster (HPB) technique. Here, the HPB technique may be a technique of using a memory area of the host 300 as a cache memory of the mapping information. For example, the HPB technique can enhance the read performance for the storage device 50 by using the memory area of the host 300 as a cache for a mapping table such as a FTL mapping table.

For example, when a logical address to be read is stored in the memory area of the host 300, the host 300 may provide a physical address obtained by referring to the mapping information to the storage device 50. Since the host 300 may directly perform a physical address search for a logical address included in the mapping information, when the logical address to be read by the host 300 is stored in the memory area, performance of the storage device 50 may be improved. Therefore, in order to improve read operation performance, the storage device 50 may recommend mapping information including a logical address expected to be read frequently by the host 300 among the mapping information stored in the storage device 50, to the host 300. The host 300 may provide a request for the mapping information to the storage device 50 in response to a recommendation of the storage device. The storage device 50 may provide the mapping information to the host 300 in response to the request of the host 300.

The operations of the host 300 and the storage device 50 using the HPB technique are described in detail with reference to FIG. 3.

In an embodiment, the memory controller 200 includes a recommendation signal manager 210 and a host controller 220.

The recommendation signal manager 210 may store a plurality of recommendation signals. Here, the recommendation signal may be data provided to the host 300 to recommend the mapping information to the host 300 and activate the memory area of the host 300 that stores the recommended mapping information. Alternatively, the recommendation signal may be data provided to the host 300 to deactivate the activated memory area.

In an embodiment, the recommendation signal manager 210 may generate a recommendation signal queue storing a plurality of recommendation signals. The recommendation signal queue may be a structure for managing a list of a recommendation signal to be provided to the host 300. For example, the recommendation signal queue may first output a recommendation signal stored in the recommendation signal queue first according to a first-in first-out (FIFO) method. In an embodiment, a storage capacity capable of maximally storing the recommendation signals in the recommendation signal queue may be preset, but is not limited thereto. For example, the storage capacity of the recommendation signal queue may not be preset, and the storage capacity may increase whenever the recommendation signal is generated.

In addition, the recommendation signal manager 210 may store the number of recommendation signals provided to the host 300. In some implementations, the number of recommendation signals provided to the host 300 may indicate the number of recommendation signals for which a response has not been received after being provided to the host 300. The recommendation signal manager 210 may increase the number of recommendation signals provided to the host 300 whenever the recommendation signal is provided to the host 300. Conversely, when receiving the request for the mapping information in response to the recommendation signal from the host 300, the recommendation signal manager 210 may decrease the number of recommendation signals provided to the host 300.

The host controller 220 may provide at least one recommendation signal to the host 300. The host controller 220 may provide the recommendation signal to the host 300 according to whether the number of recommendation signals provided to the host 300 is less than a threshold value (e.g., preset threshold value). In some implementations, the threshold value may indicate the maximum number of recommendation signals that may be provided to the host 300. As the number of recommendation signals accumulated in the host 300 increases, a bottleneck may occur due to the increase in the number of requests for the mapping information that is required to be provided from the host 300 to the storage device 50. Therefore, the threshold value may be a value that can prevent such a bottleneck when the host 300 processes the accumulated recommendation signals.

For example, when the number of recommendation signals provided to the host 300 is less than the preset threshold value, the host controller 220 may provide at least one recommendation signal to the host 300. In this case, the host controller 220 may provide at least one recommendation signal to the host 300 until the number of recommendation signals provided to the host 300 reaches the preset threshold value. Alternatively, when the number of recommendation signals provided to the host 300 is equal to or greater than the preset threshold value, the host controller 220 may maintain a plurality of recommendation signals in the recommendation signal queue. That is, the host controller 220 may not provide the recommendation signal to the host 300, and may manage the recommendation signals in the recommendation signal queue until the number of recommendation signals becomes less than the preset threshold value.

In addition, the host controller 220 may receive the request for the mapping information to be stored in the memory area from the host 300 in response to the recommendation signal provided to the host 300. Here, the request for the mapping information may be referred to as a "read buffer request." The host controller 220 may provide the mapping information to the host 300 in response to the request for the mapping information.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host 300 may include a mapping information storage area 310 for storing mapping information provided from the storage device 50. A description of the mapping information storage area 310 is described in detail with reference to FIG. 2.

FIG. 2 is a diagram illustrating an example of a mapping information storage area based on some embodiments of the disclosed technology.

Referring to FIG. 2, the mapping information storage area 310 may include a plurality of memory areas. Here, the plurality of memory areas may be activated or deactivated according to the recommendation signal of the storage device 50. The activated memory area may store the mapping information.

For example, when receiving a recommendation signal for a memory area 1 from the host controller 220, the mapping information storage area 310 may activate the memory area 1. Thereafter, the mapping information storage area 310 may store the mapping information received from the host controller 220 in the memory area 1. The mapping information stored in the mapping information storage area 310 may be used to convert the logical address into the physical address when a read request is provided to the storage device 50.

FIG. 3 is a diagram illustrating example operations of a host and a storage device based on some embodiments of the disclosed technology.

Referring to FIG. 3, at S201, the storage device 50 may generate the recommendation signal. For example, the storage device 50 may determine the mapping information expected to be frequently read by the host 300 based on a recently performed read operation, the number of reads of the mapping information, and others. The storage device 50 may generate the recommendation signal for activating the memory area of the host 300 to store the mapping information in the host 300.

At S203, the storage device 50 may provide the recommendation signal to the host 300.

At S205, the host 300 may activate the memory area according to the recommendation signal.

At S207, the host 300 may provide the request for the mapping information to the storage device 50.

At S209, the storage device 50 may read the requested mapping information.

At S211, the storage device 50 may provide the mapping information to the host 300.

At S213, the host 300 may store the mapping information in the activated memory area.

At S215, the host 300 may provide the read request to the storage device 50. Here, the host 300 may provide the logical address and the physical address corresponding to the logical address to the storage device 50 together with the read request.

At S217, the storage device 50 may perform the read operation according to the read request.

In other implementations, the storage device 50 may receive the request for the mapping information in response to the recommendation signal from the host 300 and then provide another recommendation signal to the host 300. That is, the storage device 50 may provide the recommendation signal in a synchronous method. In other words, even though the storage device 50 generates another recommendation signal after providing the recommendation signal to the host 300, the storage device 50 does not provide the other recommendation signal until the storage device 50 receives a response to a previously provided recommendation signal. In addition, even though the host 300 receives the recommendation signal, there may be a case where the host 300 may not immediately provide the response to the recommendation signal according to a schedule of the host 300. In this case, a problem that performance of the storage device 50 is reduced may occur.

Therefore, in some embodiments of the disclosed technology, the performance of the storage device 50 may be improved by providing at least one recommendation signal to the host 300. That is, the storage device 50 may provide one or more recommendation signals to the host 300 through an asynchronous method regardless of whether the response to the recommendation signal provided to the host 300 is received.

FIG. 4 is a diagram illustrating an example of a recommendation signal manager based on some embodiments of the disclosed technology.

Referring to FIG. 4, the recommendation signal manager 210 may include a recommendation signal queue generator 211 and a recommendation signal number storage circuit 212.

The recommendation signal queue generator 211 may generate the recommendation signal queue storing the plurality of recommendation signals.

In an embodiment, the recommendation signal queue generator 211 may store the plurality of recommendation signals in the recommendation signal queue in the order of generation of the plurality of recommendation signals. For example, when the recommendation signal is generated, the recommendation signal queue generator 211 may store the generated recommendation signal in the recommendation signal queue.

In an embodiment, the recommendation signal queue generator 211 may remove at least one recommendation signal from the recommendation signal queue after at least one recommendation signal is provided to the host 300. In other words, the recommendation signal queue generator 211 may remove the recommendation signal provided to the host 300 from the recommendation signal queue.

The recommendation signal number storage circuit 212 may store the number of recommendation signals provided to the host 300. In addition, the recommendation signal number storage circuit 212 may store the threshold value of the recommendation signal that may be provided to the host 300. A description of the recommendation signal number storage circuit 212 is described in detail with reference to FIG. 6.

FIG. 5 is a diagram illustrating an example of a recommendation signal queue based on some embodiments of the disclosed technology.

Referring to FIG. 5, the recommendation signal queue may store a plurality of recommendation signals to be provided to the host 300.

The recommendation signals may be inserted into the recommendation signal queue first in the order of generation of the recommendation signal. In addition, the recommendation signals may be output in the order of queue entries of the recommendation signal in the recommendation signal queue. In one implementation, the earlier the recommendation signals are inserted into the recommendation signal queue, the earlier the recommendation signals may be output from the recommendation signal queue. In another implementation, the recommendation signal queue may output the last inserted recommendation signal.

In addition, the recommendation signal queue may include head index information and tail index information. A head index may indicate the location or address in the recommendation signal queue the recommendation signal is output from. For example, when the recommendation signal is output under control of the host controller 220, the recommendation signal is output from the location in the recommendation signal queue indicated by the head index, and then the head index value increases by a certain increment (e.g., '1'). In addition, a tail index may indicate the location or address in the recommendation signal queue the recommendation signal is stored to. For example, when the recommendation signal is stored under the control of the host controller 220, the recommendation signal is stored to the location or address in the recommendation signal queue indicated by the tail index, and then a tail index value increases by a certain increment (e.g., '1').

FIG. 6 is a diagram illustrating an example of a recommendation signal number storage circuit based on some embodiments of the disclosed technology.

Referring to FIG. 6, the recommendation signal number storage circuit 212 may store the number #RCD of recommendation signals provided to the host 300 and a threshold value ("threshold" in FIG. 6) of the recommendation signal that may be provided to the host 300.

The recommendation signal number storage circuit 212 may increase or decrease the number #RCD of recommendation signals provided to the host 300 whenever the recommendation signal is provided to the host 300 or the response to the recommendation signal is received from the host 300.

In an embodiment, when the recommendation signal number storage circuit 212 provides any one of the plurality of recommendation signals to the host 300, the recommendation signal number storage circuit 212 may increase the number #RCD of the recommendation signals provided to the host 300. For example, the recommendation signal number storage circuit 212 may increase the number #RCD of recommendation signals provided to the host 300 whenever the recommendation signal is provided to the host.

In an embodiment, when receiving the request for the mapping information to be stored in the memory area from the host 300, the recommendation signal number storage circuit 212 may decrease the number #RCD of recommendation signals provided to the host 300. That is, when receiving the response to the recommendation signal from the host 300, the recommendation signal number storage circuit 212 may decrease the number #RCD of recommendation signals provided to the host 300.

FIG. 7 is a diagram illustrating an example operation of storing a recommendation signal in a recommendation signal queue based on some embodiments of the disclosed technology.

In FIG. 7, the number of recommendation signals provided to the host 300 may be i, and the threshold value ("threshold" in FIG. 7) of the recommendation signal provided to the host 300 may be i. This example shows that the host 300 receives recommendation signals RCD corresponding to the threshold value from the storage device 50.

Referring to FIG. 7, when a 0-th recommendation signal RCD 0 is generated, the recommendation signal manager 210 may store the 0-th recommendation signal RCD 0 in the recommendation signal queue. The recommendation signal manager 210 may increase the value of the tail index by a certain increment (e.g., '1') after storing the 0-th recommendation signal RCD 0. A subsequently generated recommendation signal may be stored in a position corresponding to index 1 in the recommendation signal queue.

Since the number of recommendation signals provided to the host 300 is equal to the threshold value, the host controller 220 may maintain the 0-th recommendation signal RCD 0 stored in the recommendation signal queue. The 0-th recommendation signal RCD 0 may be stored in the recommendation signal queue until the number of recommendation signals provided to the host 300 becomes less than the threshold value.

FIG. 8 is a diagram illustrating an example operation of providing a recommendation signal to a host based on some embodiments of the disclosed technology.

In FIG. 8, the number of recommendation signals provided to the host 300 may be i-1, and the threshold value of the recommendation signal provided to the host 300 may be i. This example shows that the number of recommendation signals provided to the host 300 is less than the threshold value.

Referring to FIG. 8, the recommendation signal queue may store a plurality of recommendation signals RCD 0 to RCD 9. In addition, the value of the tail index may be 10. The subsequently generated recommendation signal may be stored in a position corresponding to index 10 in the recommendation signal queue.

Since the number of recommendation signals provided to the host 300 is less than the threshold value, the host controller 220 may provide the recommendation signal to the host 300. Here, since the last inserted recommendation signal is the 0-th recommendation signal RCD 0, the host controller 220 may provide the 0-th recommendation signal RCD 0 to the host 300. The recommendation signal manager 210 may increase the value of the head index by a certain increment (e.g., '1'). The subsequently output recommendation signal may be a recommendation signal stored in a position corresponding to index 1 in the recommendation signal queue.

The recommendation signal manager 210 may remove the 0-th recommendation signal RCD 0 from the recommendation signal queue. In addition, the recommendation signal manager 210 may increase the number of recommendation signals provided to the host.

A bottleneck can occur when the host 300 responds to several recommendation signals. As discussed above, in some embodiments of the disclosed technology, such a bottleneck may be prevented by providing a limited number of recommendation signals to the host 300.

In addition, even if the number of recommendation signals that may be provided to the host 300 is limited, the disclosed technology may be implemented in some embodiments to provide the recommendation signals to the host 300 effectively through the recommendation signal queue.

FIG. 9 is a flowchart illustrating an example method of operating a memory controller based on some embodiments of the disclosed technology.

The method shown in FIG. 9 may be performed by, for example, the memory controller 200 shown in FIG. 1.

Referring to FIG. 9, at S901, the memory controller 200 may generate the recommendation signal queue.

At S903, the memory controller 200 may store the recommendation signal in the recommendation signal queue. When storing the plurality of recommendation signals, the memory controller 200 may store the plurality of recommendation signals in the recommendation signal queue in the order of generation of the plurality of recommendation signals.

At S905, the memory controller 200 may calculate the number of recommendation signals provided to the host 300.

At S907, the memory controller 200 may determine whether the number of recommendation signals provided to the host 300 is less than the preset threshold value.

For example, when the number of recommendation signals provided to the host 300 is less than the preset threshold value, at S909, the memory controller 200 may provide the recommendation signal to the host. For example, the memory controller 200 may provide at least one recommendation signal to the host 300 in the order of queue entries of the recommendation signal stored in the recommendation signal queue until the number of recommendation signals provided to the host 300 reaches the preset threshold value.

At S911, the memory controller 200 may remove the recommendation signal provided to the host 300 from the recommendation signal queue.

When the number of recommendation signals provided to the host 300 is equal to or greater than the preset threshold value according to a determination result at S907, the memory controller 200 may end the step. That is, the memory controller 200 may maintain the recommendation signal stored in the recommendation signal queue in a stored state.

FIG. 10 is a flowchart illustrating an example operation of calculating the number of recommendation signals provided to a host based on some embodiments of the disclosed technology.

The method shown in FIG. 10 may be performed by, for example, the memory controller 200 shown in FIG. 1.

Referring to FIG. 10, at S1001, the memory controller 200 may provide the recommendation signal to the host 300.

At S1003, the memory controller 200 may increase the number of recommendation signals provided to the host 300.

Figure 11:
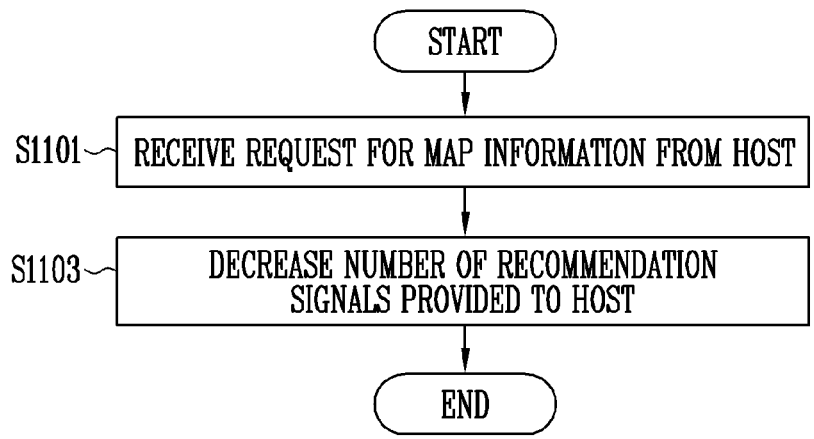
FIG. 11 is a flowchart illustrating another example operation of calculating the number of recommendation signals provided to a host based on some embodiments of the disclosed technology.

FIG. 11 is a flowchart illustrating another example operation of calculating the number of recommendation signals provided to a host based on some embodiments of the disclosed technology.

The method shown in FIG. 11 may be performed, for example, by the memory controller 200 shown in FIG. 1.

Referring to FIG. 11, at S1101, the memory controller 200 may receive the request for the mapping information from the host 300 in response to the recommendation signal.

At S1103, the memory controller 200 may decrease the number of recommendation signals provided to the host 300.

Figure 12:
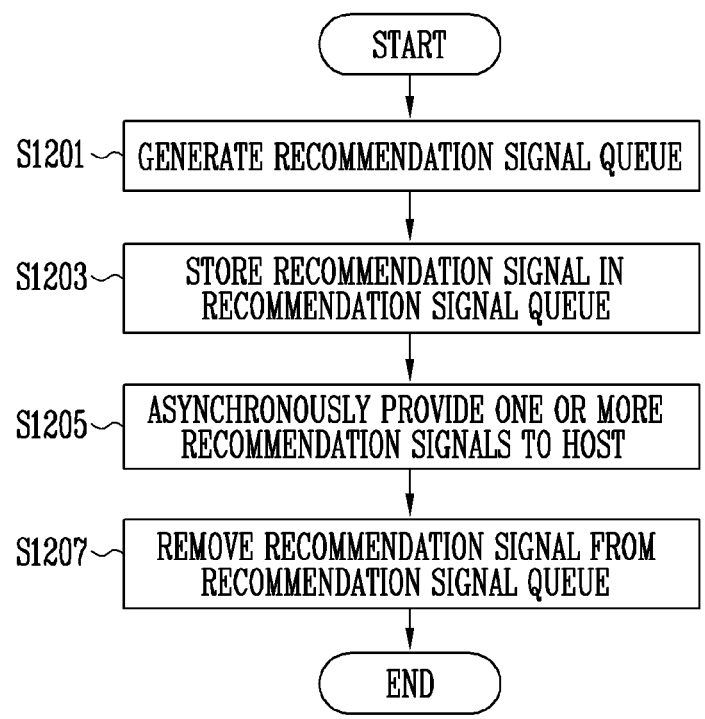
FIG. 12 is a flowchart illustrating an example method of operating a memory controller based on some embodiments of the disclosed technology.

FIG. 12 is a flowchart illustrating an example method of operating a memory controller based on some embodiments of the disclosed technology.

The method shown in FIG. 12 may be performed, for example, by the memory controller 200 shown in FIG. 1.

Referring to FIG. 12, at S1201, the memory controller 200 may generate the recommendation signal queue.

At S1203, the memory controller 200 may store the recommendation signal in the recommendation signal queue. When storing the plurality of recommendation signals, the memory controller 200 may store the plurality of recommendation signals in the recommendation signal queue in the order of generation of the plurality of recommendation signals.

At S1205, the memory controller 200 may asynchronously provide at least one recommendation signal to the host 300. For example, when the number of recommendation signals provided to the host 300 is less than the preset threshold value, the memory controller 200 may provide at least one recommendation signal to the host 300 regardless of whether the response to the corresponding recommendation signals is received.

At S1207, the memory controller 200 may remove the recommendation signal provided to the host 300 from the recommendation signal queue.

Figure 13:
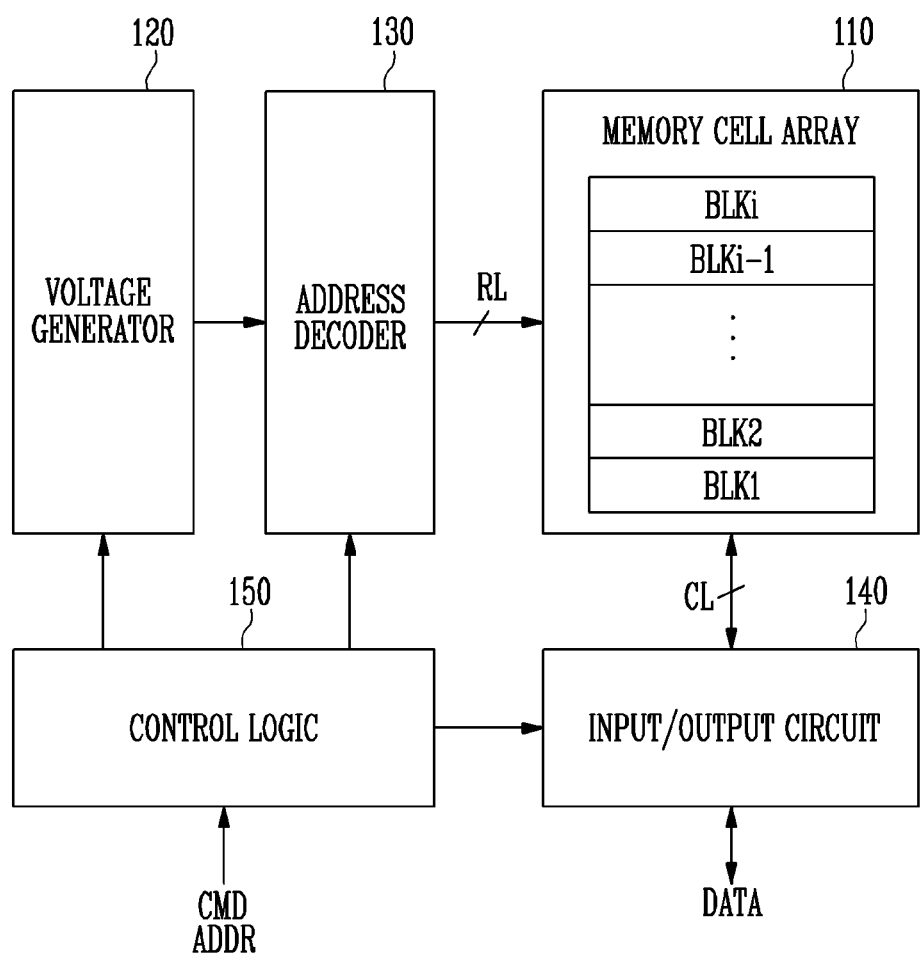
FIG. 13 is a diagram illustrating an example of a memory device of FIG. 1.

FIG. 13 is a diagram illustrating an example of the memory device of FIG. 1.

Referring to FIG. 13, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the write operation, the read operation, and the erase operation.

The voltage generator 120 is configured to generate a plurality of operation voltages Vop using an external power voltage supplied to the memory device 100. The voltage generator 120 operates in response to the control of the control logic 150.

As an embodiment, the voltage generator 120 may generate an internal power voltage by regulating the external power voltage. The internal power voltage generated by the voltage generator 120 is used as an operation voltage of the memory device 100.

As an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

In some embodiments of the disclosed technology, during the read operation, the address decoder 130 may apply a read voltage to a selected word line and a read pass voltage of a level higher than that of the read voltage to unselected word lines.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the write operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate various signals in response to the command CMD and the address ADDR to control the peripheral circuits.

Figure 14:
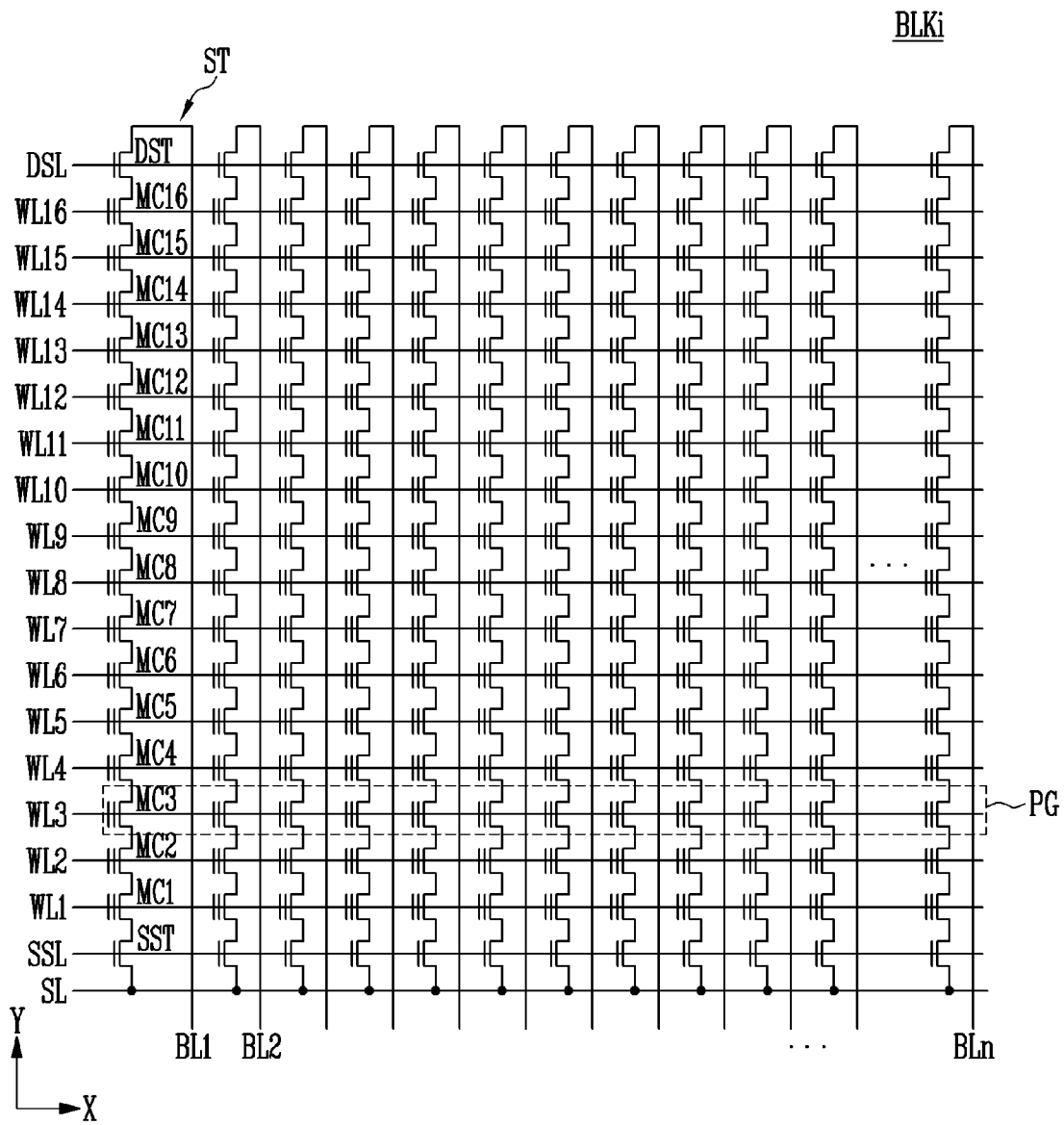
FIG. 14 is a diagram illustrating an example structure of any one of memory blocks of FIG. 13.

FIG. 14 is a diagram illustrating an example structure of any one of the memory blocks of FIG. 13.

The memory block BLKi is any one memory block BLKi among the memory blocks BLK1 to BLKi of FIG. 13.

Referring to FIG. 14, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example. In this patent document, the word "string" can be used to indicate a set of memory cells coupled in series. In some implementations, the NAND strings may include a set of flash memory cells coupled in series.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16 more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include the pages PG of the number of the word lines WL1 to WL16.

One memory cell may store one bit of data. This is commonly called a single level cell (SLC). In this case, one physical page PG may store one logical page (LPG) data. The one logical page (LPG) data may include data bits of the same number as cells included in one physical page PG.

The one memory cell may store two or more bits of data. In this case, one physical page PG may store two or more logical page (LPG) data.

Figure 15:
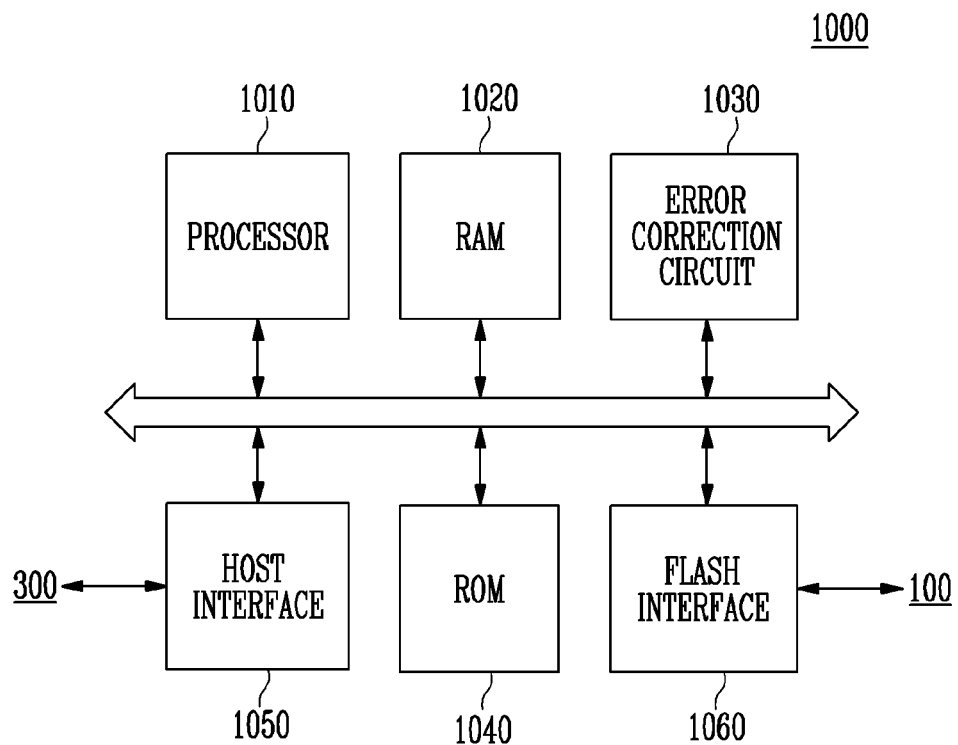
FIG. 15 is a diagram illustrating an example of a memory controller of FIG. 1.

FIG. 15 is a diagram illustrating an example of the memory controller of FIG. 1.

The memory controller 200 of FIG. 1 may have the same structure and technical feature as the memory controller 1000 of FIG. 15.

Referring to FIGS. 1 and 15, the memory controller 1000 may include a processor 1010, a RAM 1020, an error correction circuit 1030, a ROM 1040, a host interface 1050, and a flash interface 1060.

The processor 1010 may control an overall operation of the memory controller 1000. In an embodiment, the recommendation signal manager 210 and the host controller 220 of FIG. 1 may be implemented as one configuration of the processor 1010. Therefore, the processor 1010 may identically perform the operations of the recommendation signal manager 210 and the host controller 220 described with reference to FIG. 1.

For example, the processor 1010 may generate the recommendation signal queue storing the plurality of recommendation signals. When the number of recommendation signals provided to the host 300 is less than the preset threshold value, the processor 1010 may provide one or more recommendation signals stored in the recommendation signal queue to the host 300. Alternatively, when the number of recommendation signals provided to the host 300 is equal to or greater than the preset threshold value, the processor 1010 may maintain the recommendation signals stored in the recommendation signal queue in a stored state.

The RAM 1020 may be used as a buffer memory, a cache memory, an operation memory, and other memories of the memory controller 1000.

The error correction circuit 1030 may perform error correction. The error correction circuit 1030 may perform an error correction encoding (ECC encoding) based on data to be written to the memory device 100 through the flash interface 1060. The error correction-encoded data may be transferred to the memory device 100 through the flash interface 1060. The error correction circuit 1030 may perform error correction decoding (ECC decoding) on data received from the memory device 100 through the flash interface 1060. For example, the error correction circuit 1030 may be included in the flash interface 1060 as a component of the flash interface 1060.

The ROM 1040 may store various pieces of information required to operate the memory controller 1000 in a form of firmware. In an embodiment, the ROM 1040 may store the plurality of recommendation signals, the number of recommendation signals provided to the host 300, the threshold value of the recommendation signal that may be provided to the host 300.

The memory controller 1000 may communicate with an external device (for example, the host 300, an application processor, and others) through the host interface 1050.

The memory controller 1000 may communicate with the memory device 100 through the flash interface 1060. The memory controller 1000 may transmit a command, an address, a control signal, and others to the memory device 100 and receive data through the flash interface 1060. For example, the flash interface 1060 may include a NAND interface.

Figure 16:
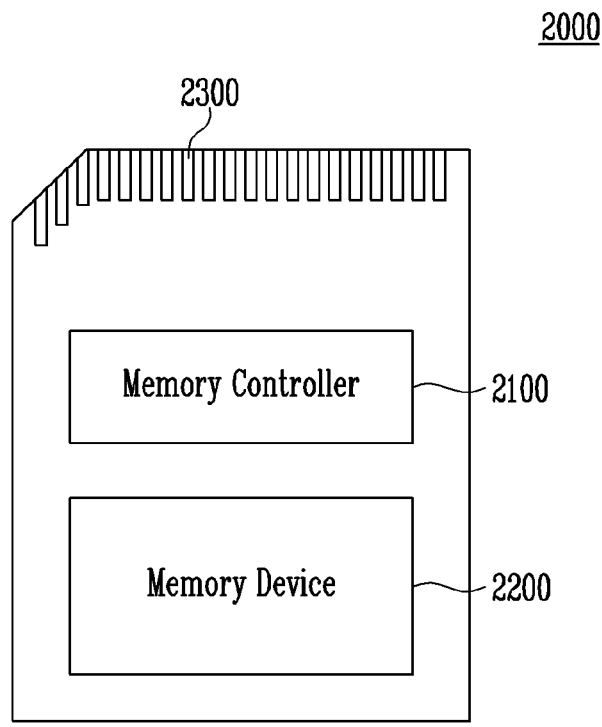
FIG. 16 is a block diagram illustrating an example of a memory card system that includes a storage device implemented based on some embodiments of the disclosed technology.

FIG. 16 is a block diagram illustrating an example of a memory card system that includes a storage device implemented based on some embodiments of the disclosed technology.

Referring to FIG. 16, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The structural and functional feature of the memory controller 2100 may be the same as the structural and functional feature of the memory controller 200 described with reference to FIG. 1. The structural and functional feature of the memory device 2200 may be the same as the structural and functional feature of the memory device 100 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 17:
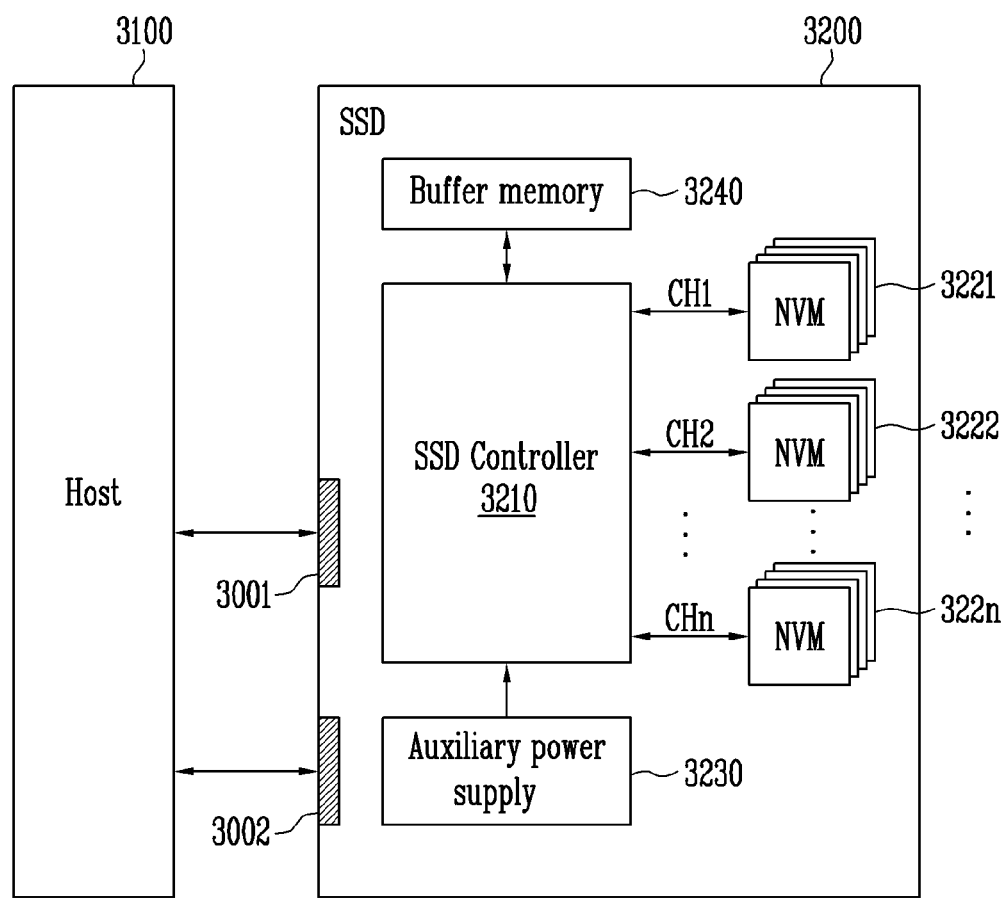
FIG. 17 is a block diagram illustrating an example of a solid state drive (SSD) system that includes a storage device implemented based on some embodiments of the disclosed technology.

FIG. 17 is a block diagram illustrating an example of a solid state drive (SSD) system that includes a storage device implemented based on some embodiments of the disclosed technology.

Referring to FIG. 17, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

In some embodiments of the disclosed technology, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 18:
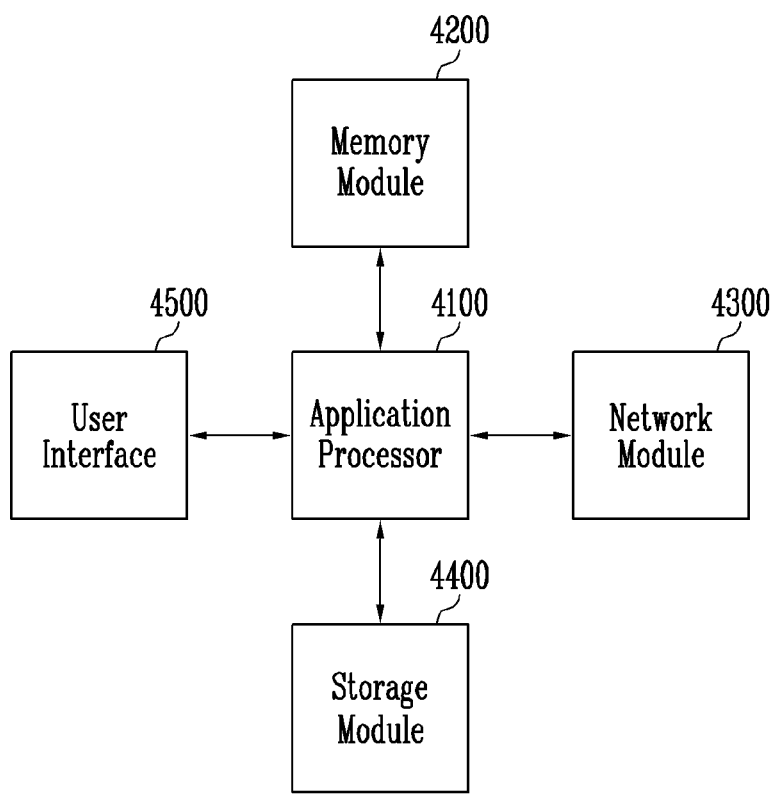
FIG. 18 is a block diagram illustrating an example of a user system that includes a storage device implemented based on some embodiments of the disclosed technology.

FIG. 18 is a block diagram illustrating an example of a user system that includes a storage device implemented based on some embodiments of the disclosed technology.

Referring to FIG. 18, the user system 4000 includes an application processor 4100, a memory module 4200, a network module 4300, a storage module 4400, and a user interface 4500.

The application processor 4100 may drive components, an operating system (OS), a user program, or others included in the user system 4000. For example, the application processor 4100 may include controllers, interfaces, graphics engines, and others that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The embodiments and implementations disclosed above are examples only; various enhancements and variations to the disclosed embodiments and implementations and other embodiments and implementations can be made based on what is described and illustrated in this patent document.

What is claimed is:

1. A memory controller for a storage device for storing data in connection with a host in communication with the storage device, comprising:
a recommendation signal manager configured to store a plurality of recommendation signals that recommends activating a memory area of the host to store mapping information in the memory area of the host; and
a host controller configured to provide at least one of the plurality of recommendation signals to the host according to whether a number of recommendation signals for which a response has not been received from the host after being provided to the host among the plurality of recommendation signals is less than a threshold value,
wherein the response includes a request for the mapping information to be stored in the memory area in response to a recommendation signal provided to the host.

2. The memory controller of claim 1, wherein the recommendation signal manager comprises:
a recommendation signal queue generator configured to generate a recommendation signal queue for storing the plurality of recommendation signals; and
a recommendation signal number storage circuit configured to store the number of recommendation signals for which the response has not been received from the host after being provided to the host.

3. The memory controller of claim 2, wherein the recommendation signal queue includes a head index to indicate a location in the recommendation signal queue a recommendation signal to be output from and a tail index to indicate a location in the recommendation signal queue a recommendation signal is to be stored to.

4. The memory controller of claim 2, wherein the recommendation signal queue generator stores the plurality of recommendation signals in the recommendation signal queue in the order of generation of the plurality of recommendation signals.

5. The memory controller of claim 4, wherein the host controller provides the at least one recommendation signal to the host in the order of queue entries of the plurality of recommendation signals stored in the recommendation signal queue.

6. The memory controller of claim 2, wherein the recommendation signal queue generator removes the at least one recommendation signal from the recommendation signal queue after the at least one recommendation signal is provided to the host.

7. The memory controller of claim 2, wherein the recommendation signal number storage circuit increases the number of recommendation signals for which the response has not been received from the host after being provided to the host upon transmission of any one of the plurality of recommendation signals to the host.

8. The memory controller of claim 2, wherein the recommendation signal number storage circuit decreases the number of recommendation signals for which the response has not been received from the host after being provided to the host upon receipt of the request for the mapping information to be stored in the memory area from the host in response to the recommendation signal provided to the host.

9. The memory controller of claim 2, wherein the host controller maintains the plurality of recommendation signals in the recommendation signal queue in a case that the number of recommendation signals for which the response has not been received from the host after being provided to the host is equal to or greater than the threshold value.

10. The memory controller of claim 1, wherein the host controller provides the at least one recommendation signal to the host in a case that the number of recommendation signals for which the response has not been received from the host after being provided to the host is less than the threshold value.

11. The memory controller of claim 10, wherein the host controller provides the at least one recommendation signal to the host until the number of recommendation signals for which the response has not been received from the host after being provided to the host reaches the threshold value.

12. The memory controller of claim 1, wherein the host controller receives the request for the mapping information to be stored in the memory area from the host in response to the recommendation signal provided to the host, and provides the mapping information to the host in response to the request.

13. A method of operating a memory controller, the method comprising:
generating a recommendation signal queue storing a plurality of recommendation signals that recommend activating a memory area of a host to store mapping information in the memory area of the host;
calculating a number of recommendation signals for which the response has not been received from the host after being provided to the host; and
providing at least one of the plurality of recommendation signals to the host according to whether the number of recommendation signals for which the response has not been received from the host after being provided to the host among the plurality of recommendation signals is less than a threshold value,
wherein the response includes a request for the mapping information to be stored in the memory area in response to a recommendation signal provided to the host.

14. The method of claim 13, further comprising:
storing the plurality of recommendation signals in the recommendation signal queue in the order of generation of the plurality of recommendation signals.

15. The method of claim 14, wherein providing the at least one recommendation signal comprises providing the at least one recommendation signal to the host in the order of queue entries in the recommendation signal queue.

16. The method of claim 13, further comprising:
removing the at least one recommendation signal from the recommendation signal queue after providing the at least one recommendation signal.

17. The method of claim 13, wherein calculating the number of recommendation signals for which the response has not been received from the host after being provided to the host comprises providing any one recommendation signal among the plurality of recommendation signals to the host and then increasing the number of recommendation signals for which the response has not been received from the host after being provided to the host.

18. The method of claim 13, further comprising:
receiving the request for the mapping information to be stored in the memory area from the host in response to the recommendation signal provided to the host,
wherein calculating the number of recommendation signals for which the response has not been received from the host after being provided to the host comprises decreasing the number of recommendation signals for which the response has not been received from the host after being provided to the host after receiving the request for the mapping information.

19. The method of claim 13, wherein providing the at least one recommendation signal comprises providing the at least one recommendation signal to the host in a case that the number of recommendation signals for which the response has not been received from the host after being provided to the host is less than the threshold value.

20. The method of claim 19, wherein providing the at least one recommendation signal comprises providing the at least one recommendation signal to the host until the number of recommendation signals for which the response has not been received from the host after being provided to the host reaches the threshold value.

* * * * *